Oct. 18, 1932.　　G. A. DE VLIEG　　1,883,612
GRINDING MACHINE
Filed Nov. 3, 1930　　3 Sheets-Sheet 1
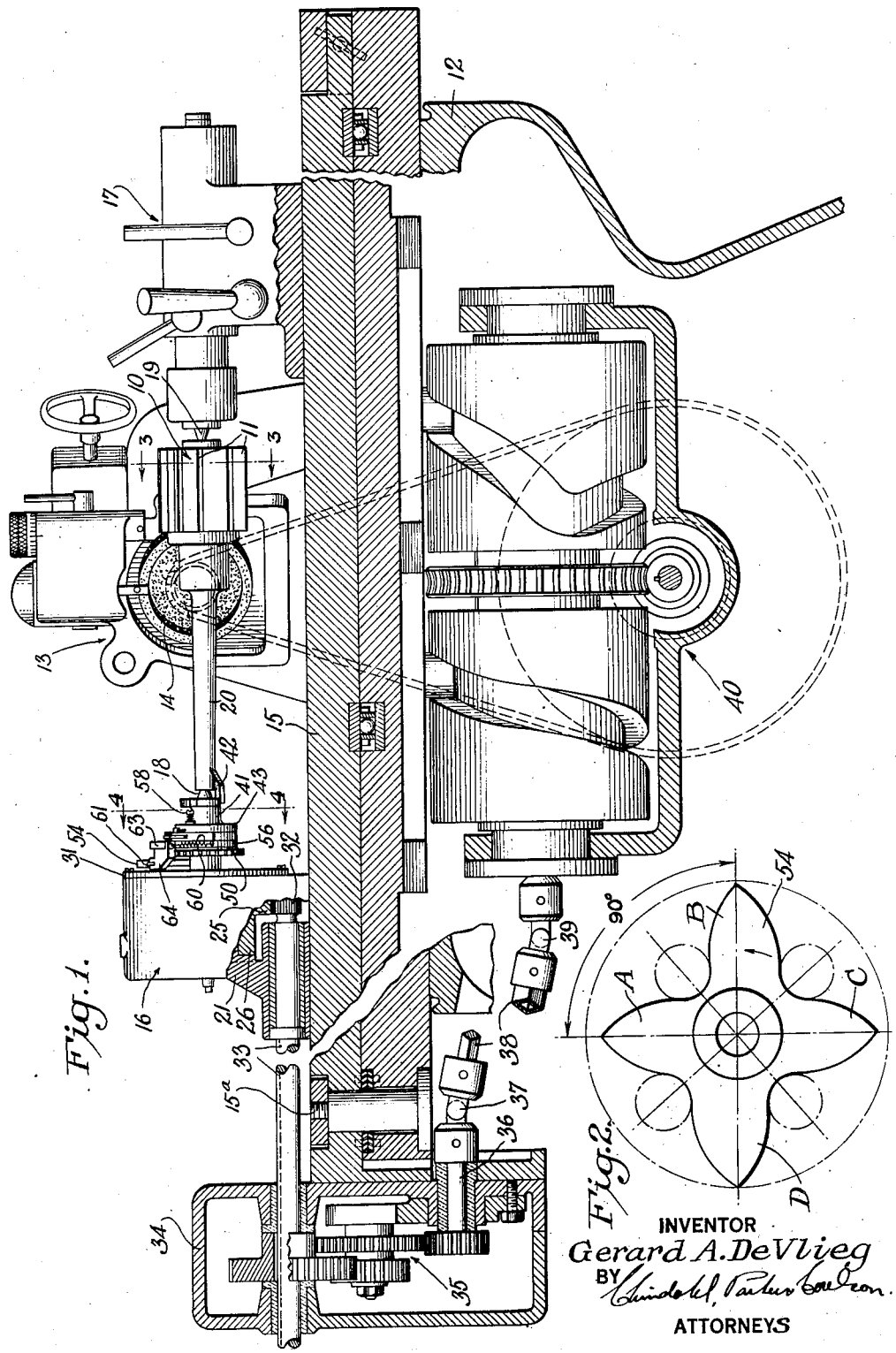
INVENTOR
Gerard A. DeVlieg
BY
ATTORNEYS Oct. 18, 1932.  G. A. DE VLIEG  1,883,612
GRINDING MACHINE
Filed Nov. 3, 1930   3 Sheets-Sheet 2
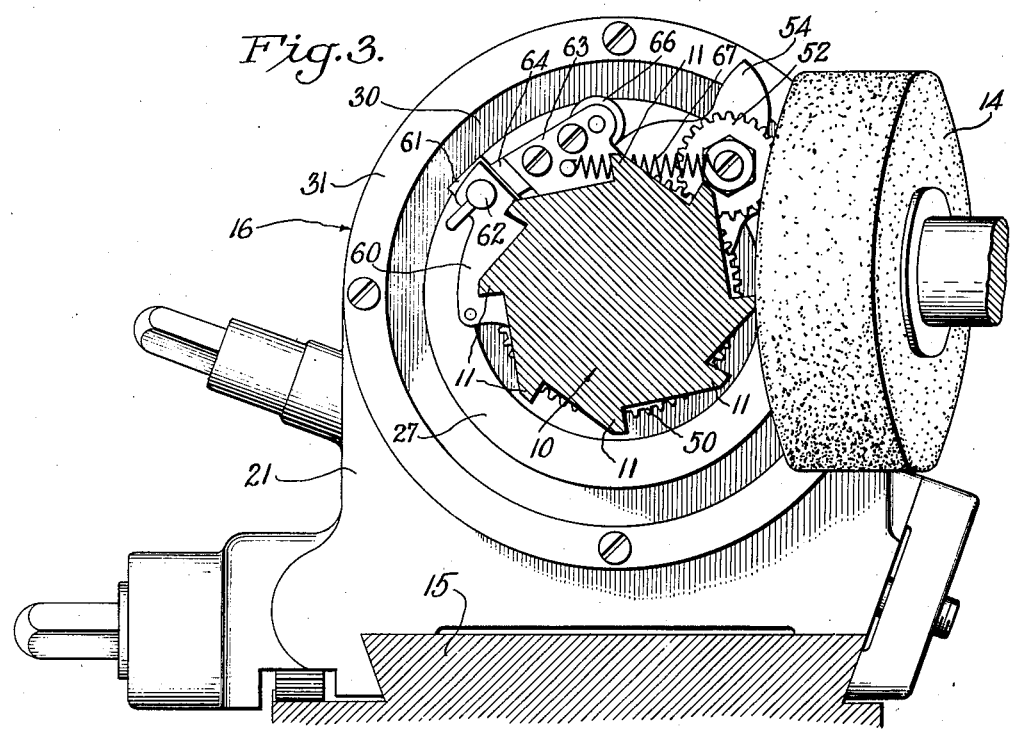
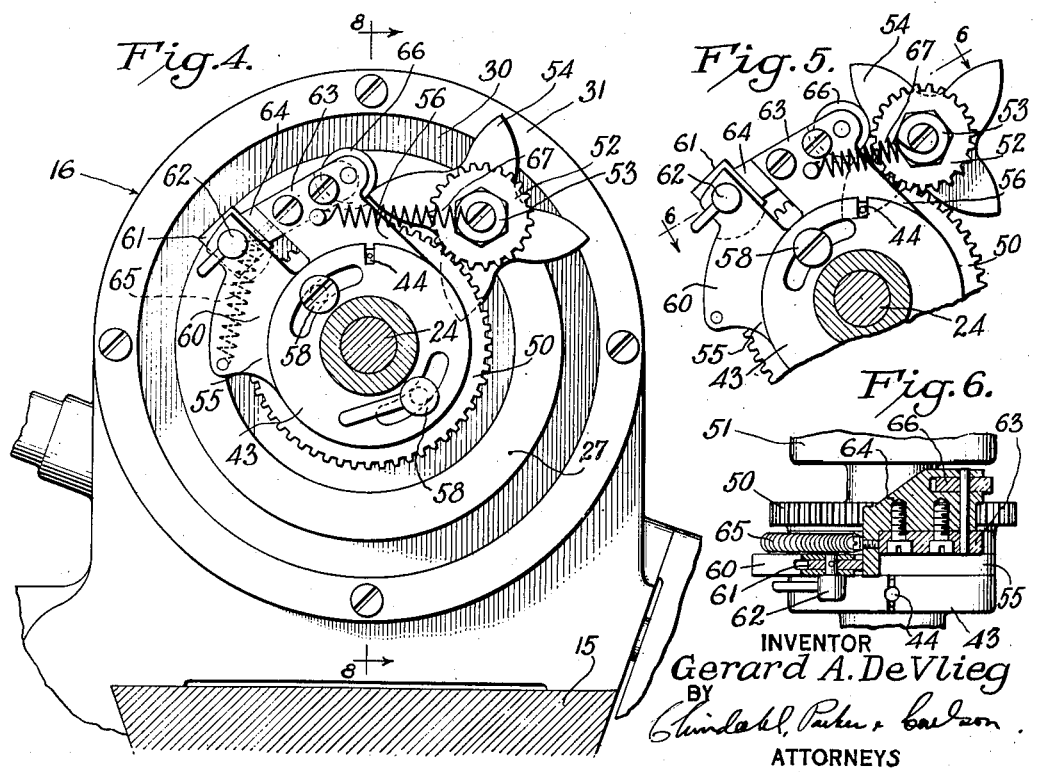
INVENTOR
Gerard A. DeVlieg
BY
ATTORNEYS

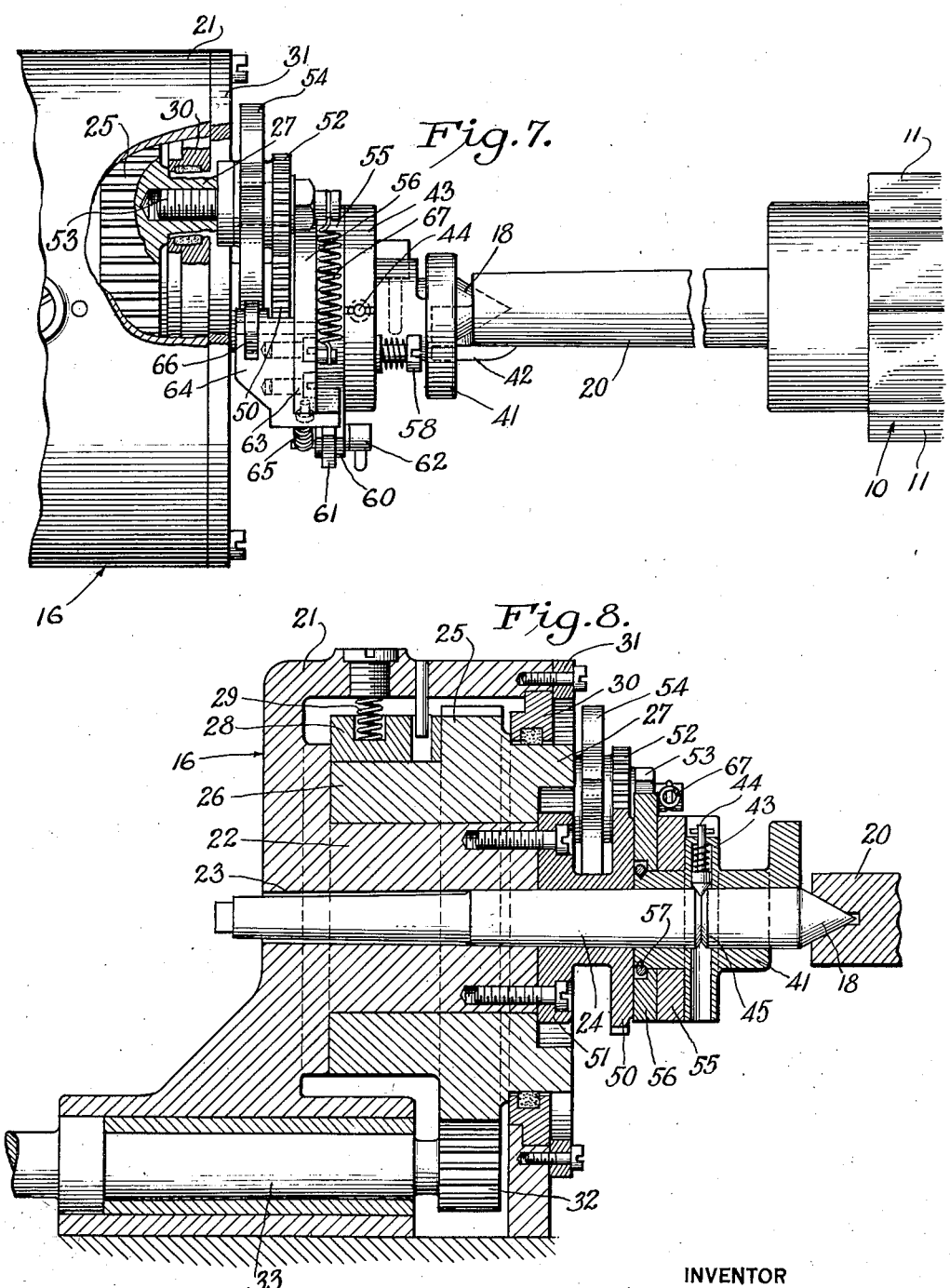

Patented Oct. 18, 1932

1,883,612

UNITED STATES PATENT OFFICE

GERARD A. DE VLIEG, OF ROCKFORD, ILLINOIS

GRINDING MACHINE

Application filed November 3, 1930. Serial No. 492,897.

The present invention relates to improvements in grinding machines, and particularly to the type of machine shown in my Patent No. 1,710,533, which is adapted primarily for grinding cutters, such as reamers, having generally longitudinal blades.

In the machine shown in said patent, which is adapted to grind cutters having inclined or spiral blades, the cutter is reciprocated longitudinally across the grinding wheel and is rotated continuously in timed relation to the reciprocation so as to compensate for the inclination of each blade during the grinding stroke and to index different blades successively into the line of grinding.

The primary object of the present invention is to provide a machine of this type having novel means for modifying the line of grinding determined by the rotation and reciprocation of the means supporting the cutter.

A more specific object resides in the provision in a machine of this type having means for rotating the cutter, of means for varying the amount of rotation produced by said firstmentioned means relative to the reciprocation of the cutter so that cutters having blades of different inclinations or straight blades may be ground.

Another object resides in the provision of a machine of the foregoing character which will grind cutters having straight blades or cutters having blades of different inclinations, in either of which the blades may be evenly or unevenly spaced.

A further object is to provide a novel grinding machine capable of attaining the foregoing objects which is simple and inexpensive in construction, and which is efficient, automatic and expeditious in operation.

Other objects and advantages will become apparent from the following description taken in connection with the accompanying drawings in which:

Figure 1 is a fragmentary longitudinal sectional view of a machine embodying the features of my invention.

Fig. 2 is a face view on an enlarged scale of the cam employed in the machine.

Fig. 3 is a sectional view on an enlarged scale taken along the line 3—3 of Fig. 1.

Fig. 4 is a sectional view on an enlarged scale taken along the line 4—4 of Fig. 1.

Fig. 5 is a fragmentary view similar to that shown in Fig. 4 but with the cam in a different position.

Fig. 6 is a sectional view taken along the line 6—6 of Fig. 5.

Fig. 7 is a fragmentary plan view on an enlarged scale with parts broken away.

Fig. 8 is a fragmentary sectional view taken on the line 8—8 of Fig. 4.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

As mentioned above, the preferred embodiment of the invention is incorporated in a grinding machine of the type disclosed in my prior Patent No. 1,710,533, and comprises briefly a grinding element, a work support for a rotary work piece, such as a reamer, having a plurality of peripherally spaced blades, means for effecting relative reciprocation between the work support and the grinding element axially of the work piece, a rotary driving member mounted on the work support and continuously rotating in timed relation to the reciprocation, and means for connecting the driving member to the work piece and constructed to modify the rotation normally imparted by the driving member to the work piece so that cutters having blades of inclinations other than that for which the rotation of the driving member is adapted, or cutters having straight blades may be ground. The means for connecting the driving member to the work piece also is constructed to control the indexing of the cutter so that cutters having either equally spaced or unequally spaced blades may be ground.

In the drawings, a cutter is shown at 10, which comprises a plurality, eight in the present instance, of straight blades 11. These blades may be spaced in any desired manner, and in the present instance are arranged in pairs of diametrically opposed blades requiring the same angular setting. Thus, if the blades over one-half of the circumference are spaced unequally, four different adjustments or index movements are required.

The grinding machine comprises generally a base 12 having a vertical standard 13 on the rear. Rotatably mounted in the vertical standard 13 is a grinding wheel 14 which preferably is cup-shaped, and which is inclined slightly from a perpendicular to the front of the machine so as to provide clearance.

Mounted for reciprocation on the front of the base 12 and transversely of the face of the grinding wheel 14 is a carriage 15 on the opposite ends of which are adjustably mounted a headstock 16 and a tailstock 17 having centers 18 and 19 respectively. An arbor 20 adapted to support the cutter 10 is mounted between the centers 18 and 19.

Preferably, the headstock 16 is formed with a housing 21 slidably adjusted on the carriage 15. Formed integrally with the left wall of the housing 21 is a bearing sleeve 22 having a taper bore 23 which receives the taper shank 24 of the work center 18. Rotatably mounted on the bearing sleeve 22 is a driving member or gear 25 having a hub 26 on its left end, and having an annular flange 27 on its right end, concentric with the center 18 and projecting out from the right end of the housing 21. To prevent back lash, a brake shoe 28 is pressed by a spring 29 against the hub 26 of the gear 25. The right-hand end of the housing 21 is closed by a member 30 engaging the outer periphery of the flange 27 and secured against a shoulder cut in the end of the housing 21 by a ring 31 bolted to the housing.

The gear 25 meshes with a pinion 32 on a horizontal shaft 33 which is adjustable with the headstock 16, and which extends slidably through a gear housing 34 mounted on the left end of the carriage 15. The shaft 33 is connected through a train of change-speed gears 35 in the housing 34 to a stub shaft 36. The stub shaft 36 is connected through a universal joint 37 to an extensible shaft 38 which is connected through a universal joint 39 to a drive mechanism 40 (more fully described in said patent) for reciprocating the carriage 15. As a result, the gear 25 is driven in timed relation to the reciprocation of the carriage 15.

The drive mechanism 40 may be adapted to reciprocate the carriage 15 with a grinding stroke and a quick return stroke. The carriage 15 is pivoted on a pin 15ª so that it may be moved through a sufficient angle to separate the cutter 10 and the grinding wheel 14 during the return stroke when grinding cutters in which the wheel would interfere with the blades, as is described in said patent.

As mentioned above, means is provided for operatively connecting the driving member to the work piece, that is, the annular flange 27 of the gear 25 to the arbor 20 supporting the cutter 10. This means preferably comprises a drive sleeve 41 which is rotatably mounted on or about the center 18, and which has an interlocking connection with a dog 42 on the arbor 20. To secure the sleeve 41 against axial movement relative to the work center 18, a flange 43 is formed on the sleeve 41 intermediate its ends, and a spring-pressed locking pin 44 is mounted in a radial socket in the flange 43 and has a conical inner end bearing in an annular V-shaped groove 45 cut in the work center 18.

Mounted on the work center 18 between the drive sleeve 41 and the bearing sleeve 22 of the housing 21 is a gear 50 which is secured against rotation as by a flange 51 formed integrally with the gear 50 and bolted to the right end of the bearing sleeve 22. Meshing with the gear 50 is a planetary gear 52 rotatably mounted on a stud bolt 53 threaded into the annular flange 27 of the gear 25. Between the annular flange 27 and the planetary gear 52 is a cam 54 constructed to rotate with the planetary gear 52 as by forming it integrally therewith.

Mounted on the left end of the drive sleeve 41 between the flange 43 thereof and the gear 50 is a pair of disks 55 and 56 secured in place as by a spring locking ring 57 seated in an annular groove cut partially in the sleeve 41 and partially in the disk 56. The disk 55 is secured to the flange 43 for limited angular adjustment relative thereto as by a pair of clamping screws 58 extending through arcuate slots cut in the flange 43 and threaded into the disk 55.

Formed on the disk 55 is an arm 60 extending substantially radially therefrom which carries an adjustable contact block 61 pivoted thereon by means of a pin 62. The disk 56 also has an arm 63 extending radially therefrom to which is secured a block 64 having a portion extending axially to engage the contact block 61 and yieldingly held in such engagement by a spring 65 secured to the block 64 and the arm 60 carrying the contact block 61. The block 64 also has an axially extending portion carrying a roller 66 which is held in contact with the periphery of the cam 54 by a tension spring 67 secured to the stud bolt 53 supporting the cam and to the arm 63 supporting the block 64.

It will be evident that rotation of the flange 27 in a counter-clockwise direction as viewed in Fig. 4, will act through the cam 54, the cam roller 66, the arms 63 and 60, and the sleeve 41 to rotate the arbor 20. To modify the rotation which the flange 27 would normally impart, the cam 54 is so shaped that, when it is rotated about the stud bolt 53, rotation of the work piece may differ from the timed relation of the rotation of the flange 27 to the reciprocation of the carriage 15.

To this end, the cam 54 (see Fig. 2) is provided with a plurality of lobes the number of which and the relative length thereof, from a common point such as the center of rotation, are dependent upon the number and the spacing of the blades 11. Each lobe may serve one or more blades and it may be stated that the number of blades is always a multiple of the number of lobes.

In the present instance, the cam 54 is provided with four lobes A, B, C and D. Consecutive lobes are adapted to serve consecutive blades, and consecutive blades are adapted to be ground successively. Since the cutter illustrated has eight blades arranged in four pairs of diametrically opposed blades, the cam must rotate through two revolutions while the cutter is rotated through one revolution, and the ratio of gear 50 to the planetary gear 52 must be 2 to 1. It will be understood, however, that the arrangement of the lobes may be varied, even for a given cutter. Thus, consecutive lobes might serve spaced blades and spaced lobes might serve consecutive or spaced blades.

The lobes act through engagement with the roller 66 to modify the rotation normally imparted by the flange 27 so that cutters having blades of inclinations other than that for which the rotation of the flange 27 is adapted or cutters having straight blades may be ground. The lobes acting through such engagement with the roller 66 also serve to control the indexing of the cutter so that cutters having either equally spaced or unequally spaced blades may be ground.

Upon rotation of the gear 25 in a counterclockwise direction, when viewed from the right-hand end of Fig. 8, the planetary gear 52 and also the cam will rotate counterclockwise. When the roller 66 starts at the apex of a lobe, the rotation of the cam about its own axis permits the roller to move toward the following low point of the cam by a clockwise rotation relative to the flange 27. This movement is timed to occur during the grinding stroke of the carriage 15. Depending upon the extend of such movement of the roller and the counterclockwise movement of the flange 27 during the same length of time, the arbor 20 may be rotated at a different rate than the flange 27 to grind differently inclined blades, or the arbor 20 may be held without rotation during the grinding stroke to grind straight blades. In the former case, there is a difference in the extents of the two movements, while in the latter, the extents of the two movements are equal which is the case illustrated in the drawings. It will be obvious that the surface of each lobe from its apex to the following low point must be very accurately formed so that the blade being ground is accurately held in the correct line of grinding.

When the cam rotates so that the roller moves from a low point to the apex of the following lobe, the cutter is rotated an amount equal to the normal rotation of the flange 27 plus the rotation of the arm 63 relative to the flange 27 in the same time. This rotation is timed to occur during the return or non-grinding stroke of the carriage 15 and is for the purpose of indexing the cutter to bring another blade into grinding position. Thus, the extent of indexing depends upon the rotation of the arm 63 relative to the flange 27, which in turn depends upon the distance measured radially of the cam between the low point and the following apex. By properly forming these distances on the cam, the indexing of the cutter will be so controlled that the blades will be successively brought into grinding position in accordance with the spacing between the consecutive blades. As the radial distance between a low point and the following apex of the cam is the only important feature of this part of the cam, the form of each lobe between these points is not important and is controlled only by the necessity of permitting the roller 66 to run smoothly.

The cutter shown in the drawings has eight blades, the spacing of any four of which is the same as the spacing of the other four. Since the cam makes two revolutions to one of the cutter, the first revolution of the cam controls the spacing of four consecutive blades and the second revolution controls the spacing of the other four blades and will be a repetition of the first.

In operation, the necessity of properly positioning the cutter relative to the position of the cam will be noted. To this end, the apex of the lobe, the face of which controls the grinding of the initial blade, is brought into engagement with the roller 66. The cutter may then be rotatively adjusted by loosening the clamping screws 58 and rotating the disk 55 slightly relative to the flange 43 of the drive sleeve 41, until the initial blade is brought into the desired line of grinding contact. Further adjustment may be had through the contact block 61 on the arm 60. This block is square and the pin 62 upon which the block is pivoted is positioned so that it is at different distances from the four sides of the square. Thus, by placing different sides of the block in contact with the block 64 on the arm 63, the arms may be spaced different distances apart and further rotative adjustment may be given to the cutter.

After the cutter has been properly adjusted relative to the cam, the machine operation is instituted, whereupon the cutter is reciprocated. During the grinding stroke, the cutter is held so that the blade being ground is held in a proper line of grinding contact, the action of the cam so modifying the rotation normally imparted by the flange 27 that, in the present instance, the cutter is held without rotation and a straight blade is ground. On the return stroke of the cutter, the cutter is indexed to bring the next blade into position for grinding.

From the above description, it will be evident that I have provided an automatic grinding machine for grinding cutters having blades of different inclinations or cutters having straight blades, in either of which the blades may be evenly or unevenly spaced. The construction is simple and relatively inexpensive, and the operation is expeditious and efficient.

I claim as my invention:

1. A machine tool comprising, in combination, a cutting element, a work support for a work piece, means for effecting a relative reciprocation between said cutting element and said support, means tending to rotate said work piece continuously in one direction, and means for modifying the effect of said rotating means to cause an intermittent rotation of said work piece of variable extent.

2. A grinding machine comprising, in combination, a grinding element, a work support for a work piece, means for effecting a relative reciprocation between said grinding element and said support to effect a grinding stroke and a return stroke, means tending to rotate said work piece continuously in one direction during both strokes, and means for nullifying the effect of said rotating means on said work piece during the grinding stroke and for permitting a predetermined amount of rotation during the return stroke.

3. A grinding machine comprising, in combination, a grinding element, a work support for a work piece, means for effecting a relative reciprocation between said grinding element and said support, a driving means mounted on said support and rotating continuously in one direction, and means for connecting said driving means to said work piece for rotating the latter at predetermined variable intervals and in predetermined variable amounts.

4. A grinding machine comprising, in combination, a grinding element, a work support for a work piece, means for effecting a relative reciprocation between said grinding element and said support to effect a grinding stroke and a return stroke, a driving means mounted on said support and rotating continuously in one direction, and means for connecting said driving means to said work piece for rotating the latter only during return strokes and in predetermined amounts.

5. A grinding machine comprising, in combination, a grinding element, a work support for a work piece, means for effecting a relative reciprocation between said grinding element and said support, a driving means mounted on said support and rotating continuously in one direction, and means continuously connecting said driving means to said work piece and imparting to said work piece a rotation relative to said driving means and reverse and equal in extent to the rotation imparted by said driving means during the movement of the work support in one direction relative to the grinding element.

6. A grinding machine comprising, in combination, a grinding element, a work support for a work piece, means for effecting a relative reciprocation between said grinding element and said support, a driving means mounted on said support and rotating continuously in timed relation to the reciprocation of said support, and means mounted on said driving means for rotation therewith and alternately retarding and advancing the work piece rotatively in variable amounts relative to the rotation of the driving means.

7. A grinding machine comprising, in combination, a grinding element, a work support for a rotary work piece having a plurality of peripherally spaced blades, means for effecting a relative reciprocation between said grinding element and said support, a driving means mounted on said support for rotating said work piece and rotating continuously in timed relation to the reciprocation of said support, and means for modifying the effect of said driving means on said work piece in accordance with the shape and spacing of the blades.

8. A grinding machine comprising, in combination, a grinding element, a work support for a rotary work piece having a plurality of peripherally spaced straight blades, means for effecting a relative reciprocation between said grinding element and said support, driving means mounted on said support for rotating said work piece and rotating continuously in timed relation to the reciprocation of said support, and means for imparting to said work piece a counter rotation relative to the rotation of the driving means during the grinding of each blade to provide a straight line of grinding contact and for permitting said driving means to index said work piece in predetermined amounts according to the spacing of the blades.

9. A grinding machine comprising, in combination, a grinding element, a work support for a rotary work piece having a plurality of peripherally spaced blades, means for effecting a relative reciprocation between said grinding element and said support, said reciprocation comprising a grinding stroke and a return stroke, means uniformly rotating during the grinding stroke and during the return stroke, and means rendered operable by said rotating means to modify the effect of said rotation on the rotation of said work piece during the grinding stroke and to modify the effect of said rotation on the index movements to conform to the spacing of the blades.

10. A grinding machine comprising, in combination, a grinder element, a work support for a work piece, means for effecting a relative reciprocation between said grinding element and said support, a driving means mounted on said support and rotating continuously in timed relation to said reciprocation, and a connection between said driving means and the work piece including a cam engaging means rotatably mounted on said support, and a continuously rotating cam mounted on said driving means eccentrically thereof and alternately permitting said work piece to lag relative to said driving means and causing said work piece to advance relative to said driving means.

11. A grinding machine comprising, in combination, a grinding element, a work support for a rotary work piece having peripherally spaced straight blades, means for effecting a relative reciprocation between said grinding element and said support, said reciprocation comprising a grinding stroke and a return stroke, a driving means mounted on said support and rotating continuously in timed relation to said reciprocation, and a connection between said driving means and the work piece including a cam engaging means rotatably mounted on said support and adapted to be connected to the work piece, and a continuously rotating cam mounted on said driving means eccentrically thereof and permitting said work piece to remain without rotation during the grinding stroke to effect a straight line of grinding contact along each blade and adjusting said work piece rotatively during the return stroke in accordance with the spacing of the blades.

12. A grinding machine comprising, in combination, a grinding element, a work support including a headstock for supporting a rotary work piece, means for relatively reciprocating said work support and said grinding element axially of the work piece, said headstock comprising a rotary driving member, a stationary gear non-rotatively mounted concentric with said driving member, a planetary gear mounted on said driving member eccentrically thereof and meshing with said stationary gear, a cam mounted on said driving member for rotation with said planetary gear and a cam engaging means adapted to be connected to the work piece, and means for rotating said driving member.

13. A grinding machine comprising, in combination, a grinding element, a work support for supporting a rotary work piece having a plurality of peripherally spaced straight blades, means for relatively reciprocating said work support and said grinding element, a driving member rotating continuously in timed relation to the reciprocation, an arm having one end rotatably mounted on an axis concentric with said driving means and adapted to be connected to the work piece, and means carried by said driving member eccentrically thereof and engaging the free end of said arm, said last-mentioned means being constructed to permit said arm to remain without rotation during the grinding of each blade and to rotate said arm after the grinding of each blade in accordance with the spacing between said blade and the next blade.

14. A grinding machine comprising, in combination, a grinding element, a work support for a work piece having peripherally spaced blades, means for effecting a relative reciprocation between said grinding element and said support, a driving means mounted on said support and rotating continuously in timed relation to said reciprocation, and a connection between said driving means and the work piece including a cam engaging means rotatably mounted on said support, and a continuously rotating cam mounted on said driving means eccentrically thereof for rotating the work piece relative to the driving means to adjust the work piece in accordance with the spacing of the blades.

15. An indexing mechanism comprising, in combination, a continuously rotating driving element, a driven element, and means connecting said elements operable to modify the effect of the rotation of said driving element on said driven element whereby the driven element may be rotated intermittently in variable predetermined amounts.

16. An indexing mechanism comprising, in combination, a continuously rotating driving element, a driven element, and means connecting said elements comprising a movable member carried by one of said elements and coacting with the other, the movement of said member causing the driven element to be alternately retarded and advanced rotatively relative to the rotation of said driving element in variable amounts.

17. An indexing mechanism comprising, in combination, a continuously rotating driving element, a driven element, and means connecting said elements including a cam carried by said driving element and a cam engaging means carried by said driven element, said cam being formed alternately to permit said driven element to lag relative to the driving element and to cause the driven element to advance relative to the driving element.

In testimony whereof, I have hereunto affixed my signature.

GERARD A. DE VLIEG.